United States Patent
Kozuka et al.

(10) Patent No.: US 11,413,971 B2
(45) Date of Patent: Aug. 16, 2022

(54) POWER SUPPLY CIRCUIT AND MOTOR CONTROL DEVICE

(71) Applicant: JTEKT CORPORATION, Osaka (JP)

(72) Inventors: Kenichi Kozuka, Chita (JP); Masato Oda, Okazaki (JP)

(73) Assignee: JTEKT CORPORATION, Kariya (JP)

(*) Notice: Subject to any disclaimer, the term of this patent is extended or adjusted under 35 U.S.C. 154(b) by 413 days.

(21) Appl. No.: 16/664,999

(22) Filed: Oct. 28, 2019

(65) Prior Publication Data
US 2020/0139824 A1    May 7, 2020

(30) Foreign Application Priority Data
Nov. 2, 2018   (JP) .............................. JP2018-207657

(51) Int. Cl.
| | |
|---|---|
| *B60L 15/20* | (2006.01) |
| *B60L 50/51* | (2019.01) |
| *B60L 15/00* | (2006.01) |
| *G05F 1/253* | (2006.01) |
| *H02M 3/158* | (2006.01) |

(52) U.S. Cl.
CPC ......... *B60L 15/2045* (2013.01); *B60L 15/007* (2013.01); *B60L 50/51* (2019.02); *G05F 1/253* (2013.01); *H02M 3/1588* (2013.01)

(58) Field of Classification Search
CPC ...... G05F 1/253; H02M 3/1588; Y02T 10/72; Y02T 10/70; G01D 21/00; B60L 15/2045; B60L 50/51; B60L 15/007
See application file for complete search history.

(56) References Cited

U.S. PATENT DOCUMENTS 8,311,778 B2 * 11/2012 Bronczyk ............... G01D 21/00
                                                                700/47
9,744,926 B2 *  8/2017 Hirano ................... H02J 7/0068

FOREIGN PATENT DOCUMENTS

| EP | 3225957 A2 | 10/2017 |
| JP | 2009-208504 A | 9/2009 |
| WO | WO-2014114977 A2 * | 7/2014 ............ B60R 16/03 |

OTHER PUBLICATIONS

Apr. 3, 2020 European Search Report issued in Patent Application No. 19206193.5.

* cited by examiner

*Primary Examiner* — Jared Fureman
*Assistant Examiner* — Duc M Pham
(74) *Attorney, Agent, or Firm* — Oliff PLC

(57) ABSTRACT

Provided are a power supply circuit and a motor control device configured to suppress complexity in management of the power supply circuit. A switching unit acquires identification information that is information corresponding to a type of a torque sensor. Based on the acquired identification information, the switching unit outputs either a reference voltage or a power supply voltage as a standard voltage. A voltage application unit applies to the torque sensor an operation voltage in accordance with a type of the torque sensor based on the power supply voltage or the reference voltage that is the standard voltage of the voltage application unit and that is applied by the switching unit.

4 Claims, 3 Drawing Sheets

POWER SUPPLY CIRCUIT AND MOTOR CONTROL DEVICE

INCORPORATION BY REFERENCE

The disclosure of Japanese Patent Application No. 2018-207657 filed on Nov. 2, 2018 including the specification, drawings and abstract, is incorporated herein by reference in its entirety.

BACKGROUND OF THE PRESENT INVENTION

1. Field of the Present Invention

The present invention relates to a power supply circuit and a motor control device.

2. Description of the Related Art

Japanese Unexamined Patent Application Publication No. 2009-208504 (JP 2009-208504 A) discloses a torque sensor that detects steering torque. Such a torque sensor is operated by electric power supplied from a battery. Specifically, voltage of the electric power supplied from the battery is lowered to a standard voltage by a standard voltage generation circuit, and an operation voltage for driving the torque sensor is generated from the standard voltage by a sensor power supply circuit. The sensor power supply circuit applies the operation voltage to the torque sensor, whereby the torque sensor is operated.

There are various types of torque sensors that require different operation voltages for their operation. Since it is necessary to prepare a plurality of types of sensor power supply circuits in accordance with the types of torque sensors, management of the power supply circuit is complicated.

SUMMARY OF THE PRESENT INVENTION

An object of the present invention is to provide a power supply circuit and a motor control device that can suppress complexity in management of the power supply circuit.

A power supply circuit according to a first aspect of the present invention includes a voltage application unit configured to apply an operation voltage based on a standard voltage to a sensor that outputs an output value based on a detected state quantity, and a switching unit configured to switch the standard voltage of the voltage application unit so that the standard voltage becomes a voltage required to operate the sensor in accordance with a type of the sensor.

According to the above configuration, since the standard voltage of the voltage application unit is switched in accordance with the type of the sensor by the switching unit, an appropriate operation voltage corresponding to the type of the sensor can be applied by the voltage application unit. Since the operation voltage can be applied in accordance with the type of the sensor, the number of types of power supply circuits to be prepared can be reduced, and the complexity in management of the power supply circuit can be suppressed.

BRIEF DESCRIPTION OF THE DRAWINGS

The foregoing and further features and advantages of the present invention will become apparent from the following description of example embodiments with reference to the accompanying drawings, wherein like numerals are used to represent like elements and wherein.

DETAILED DESCRIPTION OF EMBODIMENTS

Figure 1:
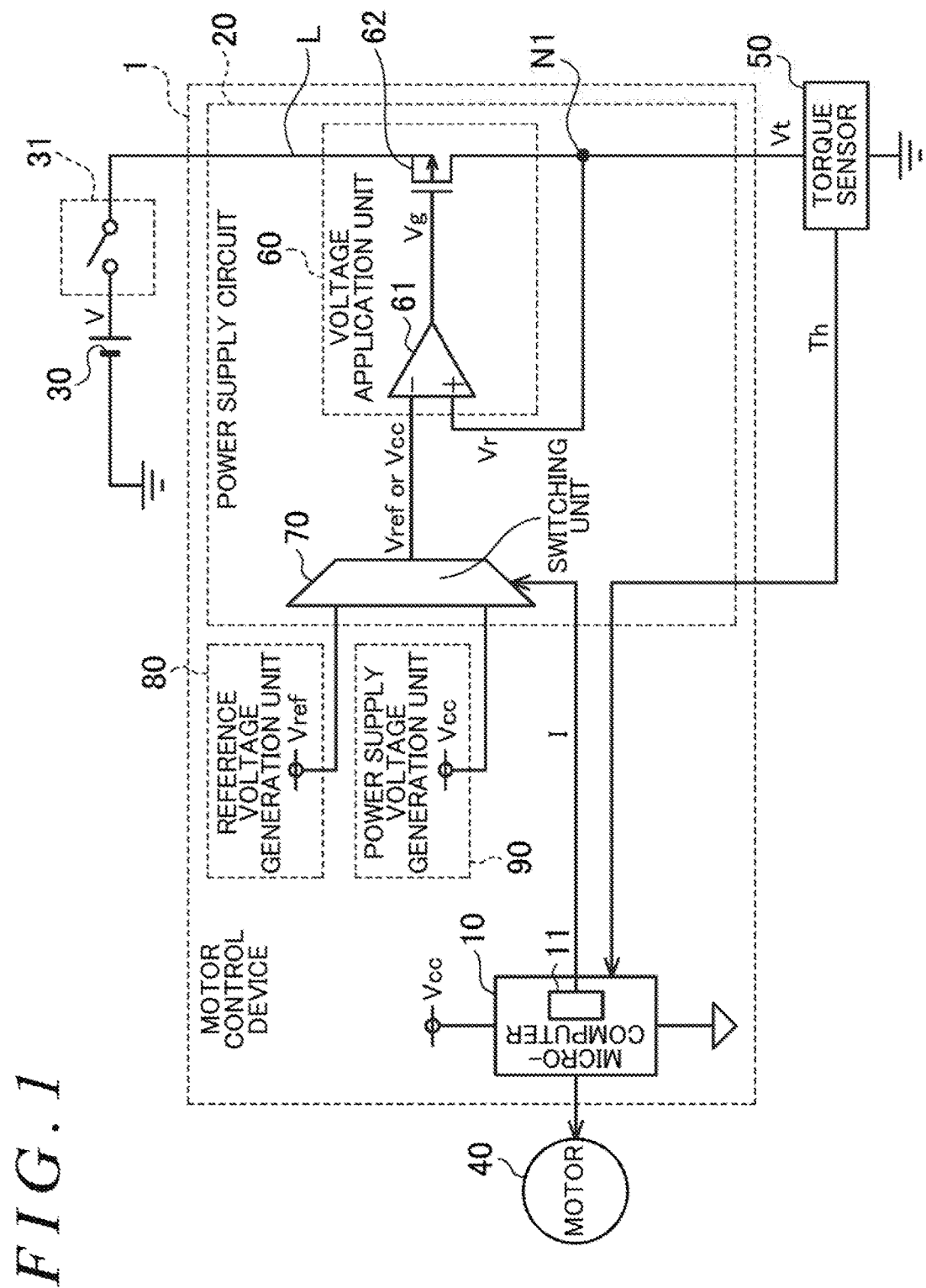
FIG. 1 is a block diagram showing a schematic configuration of a motor control device according to a first embodiment.

Hereinafter, a motor control device according to a first embodiment of the present invention is described. FIG. 1 is a diagram schematically showing a motor control device 1. In FIG. 1, illustration of resistors and the like is omitted for ease of explanation.

As shown in FIG. 1, the motor control device 1 includes a microcomputer 10 and a power supply circuit 20. The microcomputer 10 is an example of a control device. The microcomputer 10 and the power supply circuit 20 are operated by a battery voltage V supplied from a battery 30. The microcomputer 10 of the motor control device 1 is connected to a motor 40 and controls operation of the motor 40 based on outputs from various sensors. As one of the various sensors, for example, a torque sensor 50 is employed.

An ignition switch 31 is provided between the battery 30 and the power supply circuit 20. The ignition switch 31 serves as a start switch that switches between application and interruption of power supplied from the battery 30. When the driver operates a switch provided on a vehicle, the ignition switch 31 is turned on and turned off. When the ignition switch 31 is turned on, power is applied between the battery 30 and the power supply circuit 20 through the ignition switch 31. When the ignition switch 31 is turned off, power is interrupted between the battery 30 and the power supply circuit 20 through the ignition switch 31.

When power is applied between the battery 30 and the power supply circuit 20 through the ignition switch 31, power is supplied to the microcomputer 10. That is, when the ignition switch 31 is turned on, power is supplied to the microcomputer 10, whereby the microcomputer 10 is operated. Meanwhile, when power is interrupted between the battery 30 and the power supply circuit 20 through the ignition switch 31, no power is supplied to the microcomputer 10. That is, when the ignition switch 31 is turned off, no power is supplied to the microcomputer 10, whereby operation of the microcomputer 10 is stopped.

The microcomputer 10 controls power supplied to the motor 40 when the ignition switch 31 is turned on. The microcomputer 10 is composed of, for example, a microprocessing unit. The power supply circuit 20 is connected to the microcomputer 10. The power supply circuit 20 is composed by packaging a logic circuit combining an electronic circuit, a flip-flop, and the like. The power supply circuit 20 is a so-called application specific integrated circuit (ASIC). The microcomputer 10 reads a program stored in its storage unit 11 and executes a calculation in accordance with the program.

The torque sensor 50 is connected to the power supply circuit 20. The torque sensor 50 is a sensor that detects a steering torque Th applied to a steering shaft of a steering system, for example. When power is applied between the battery 30 and the power supply circuit 20 through the ignition switch 31, power is supplied to the torque sensor 50. That is, when the ignition switch 31 is turned on, power is supplied to the torque sensor 50, whereby the torque sensor 50 is operated. Meanwhile, when power is interrupted between the battery 30 and the power supply circuit 20 through the ignition switch 31, no power is supplied to the torque sensor 50. That is, when the ignition switch 31 is turned off, no power is supplied to the torque sensor 50, whereby operation of the torque sensor 50 is stopped. The torque sensor 50 is connected to the microcomputer 10. The torque sensor 50 outputs an output signal based on the detected steering torque Th to the microcomputer 10. There are various types of torque sensors 50 that require different operation voltages Vt for their operation. For example, there is a torque sensor 50 that outputs the detected steering torque Th as a voltage (that is, an analog value) as well as a torque sensor 50 that outputs the detected steering torque Th as a digital value. Therefore, in the present embodiment, the motor control device 1 is configured such that different operation voltages Vt can be applied to the torque sensor 50 depending on the type of the torque sensor 50.

The storage unit 11 of the microcomputer 10 stores identification information I that is information corresponding to the type of the torque sensor 50 connected to the motor control device 1 of the present embodiment. The identification information I of the present embodiment is information especially indicating an output mode of the output signal, more specifically, whether the output signal of the torque sensor 50 is an analog signal or a digital signal. The microcomputer 10 outputs the identification information I to the power supply circuit 20 at the timing when the ignition switch 31 is turned on. The microcomputer 10 grasps the output mode of the output signal of the torque sensor 50 from a communication standard of a connector of the torque sensor 50 connected to a connector of the microcomputer 10. When the output mode of the output signal of the torque sensor 50 is an analog value, the microcomputer 10 outputs, for example, "0" as the identification information I for generating the operation voltage Vt corresponding to the torque sensor 50 that outputs an analog value. Further, when the output mode of the output signal of the torque sensor 50 is a digital value, the microcomputer 10 outputs, for example, "1" as the identification information I for generating the operation voltage Vt corresponding to the torque sensor 50 that outputs a digital value. An example of a first sensor described in the claims is the torque sensor 50 that outputs an analog value, and an example of a second sensor described in the claims is the torque sensor 50 that outputs a digital value.

The power supply circuit 20 includes a voltage application unit 60 and a switching unit 70, and is connected to a reference voltage generation unit 80 and a power supply voltage generation unit 90. The reference voltage generation unit 80 generates a reference voltage Vref that is a constant voltage from the battery voltage V of the battery 30. An example of a second standard voltage generation circuit described in the claims is the reference voltage generation unit 80, and an example of a second standard voltage described in the claims is the reference voltage Vref.

The power supply voltage generation unit 90 generates a power supply voltage Vcc that is a constant voltage from the reference voltage Vref generated by the reference voltage generation unit 80. The microcomputer 10 is operated based on the power supply voltage Vcc generated by the power supply voltage generation unit 90. An example of a first standard voltage generation circuit described in the claims is the power supply voltage generation unit 90, and an example of a first standard voltage described in the claims is the power supply voltage Vcc.

The switching unit 70 is a multiplexer that receives two or more inputs and outputs one signal. Specifically, the switching unit 70 acquires the reference voltage Vref generated by the reference voltage generation unit 80 and the power supply voltage Vcc generated by the power supply voltage generation unit 90. The switching unit 70 acquires the identification information I output from the microcomputer 10. Based on the acquired identification information I, the switching unit 70 outputs either the reference voltage Vref or the power supply voltage Vcc as a standard voltage. Specifically, the switching unit 70 outputs the power supply voltage Vcc when the identification information I is "0", and outputs the reference voltage Vref when the identification information I is "1". Thus, the switching unit 70 outputs either the reference voltage Vref or the power supply voltage Vcc selected in accordance with the type of the torque sensor 50.

The voltage application unit 60 applies the operation voltage Vt to the torque sensor 50 using the battery voltage V supplied from the battery 30 through the ignition switch 31. The voltage application unit 60 lowers the battery voltage V supplied from the battery 30 based on either the reference voltage Vref or the power supply voltage Vcc selected by the switching unit 70, thereby generating the operation voltage Vt of the torque sensor 50. The voltage application unit 60 includes an operational amplifier 61 and a transistor 62.

The transistor 62 is provided on a power supply line L between the ignition switch 31 and the torque sensor 50. The transistor 62 is a metal-oxide-semiconductor field-effect transistor (MOSFET). A source of the transistor 62 is connected to the ignition switch 31 side, which is a positive side of the battery 30, and a drain of the transistor 62 is connected to the torque sensor 50 side. A gate of the transistor 62 is connected to an output terminal of the operational amplifier 61. An inverting input terminal of the operational amplifier 61 is connected to the output terminal of the switching unit 70. A non-inverting input terminal of the operational amplifier 61 is connected to a node N1 provided on the power supply line L between the transistor 62 and the torque sensor 50. By providing the operational amplifier 61 in this manner, negative feedback of the operational amplifier 61 is performed. The operational amplifier 61 outputs a gate voltage Vg from its output terminal. The gate voltage Vg is a voltage based on a deviation between a voltage input to the inverting input terminal and a feedback voltage Vr input to the non-inverting input terminal. Depending on a setting of the operational amplifier 61, the gate voltage Vg may be larger than, smaller than, or equal to the deviation between the voltage input to the inverting input terminal and the feedback voltage Vr input to the non-inverting input terminal. The operation voltage Vt of the torque sensor 50 is generated from the battery voltage V of the battery 30 by switching on/off of the transistor 62 in accordance with the gate voltage Vg applied to the gate of the transistor 62. Specifically, when the gate voltage Vg based on a deviation between the power supply voltage Vcc and the feedback voltage Vr is applied to the gate, the transistor 62 lowers the battery voltage V of the battery 30 to generate the operation voltage Vt of the torque sensor 50 that outputs an analog value. When the gate voltage Vg based on the deviation between the reference voltage Vref and the feedback voltage Vr is applied to the gate, the transistor 62 may lower the battery voltage V of the battery 30 to generate the operation voltage Vt of the torque sensor 50 that outputs a digital value. Thus, the voltage application unit 60 can apply to the torque sensor 50 the operation voltage Vt in accordance with the type of the torque sensor 50 based on the power supply voltage Vcc or the reference voltage Vref, which is the standard voltage of the voltage application unit 60 applied by the switching unit 70.

Figure 2:
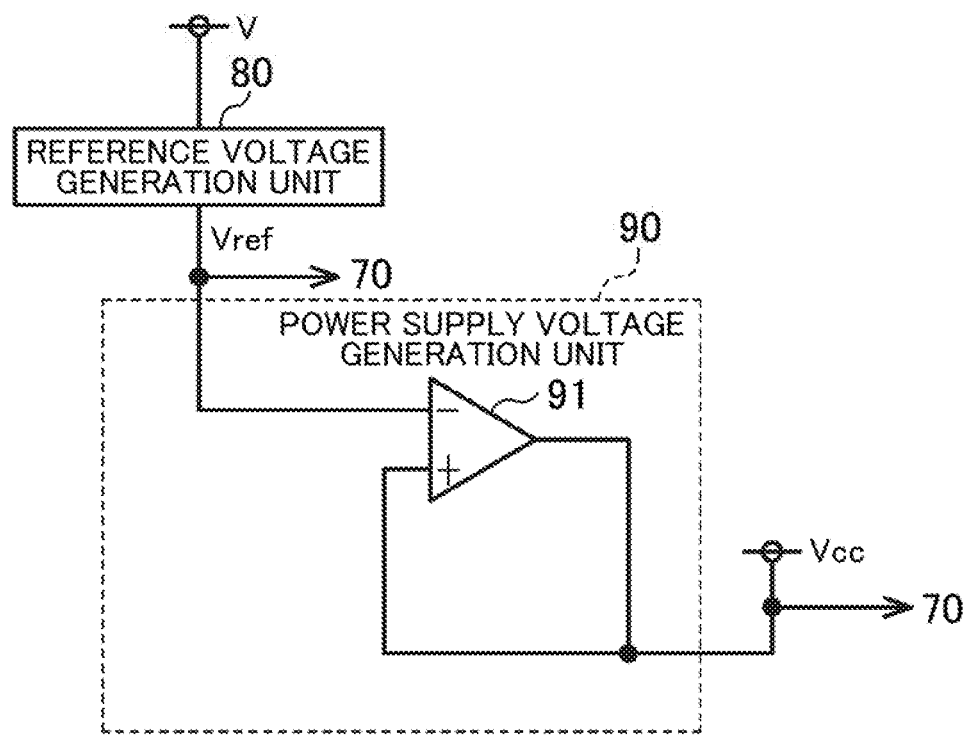
FIG. 2 is a block diagram showing a schematic configuration of a reference voltage generation unit and a power supply voltage generation unit.

The reference voltage generation unit 80 and the power supply voltage generation unit 90 will be described with reference to FIG. 2. FIG. 2 schematically shows the reference voltage generation unit 80 and the power supply voltage generation unit 90. In FIG. 2, illustration of resistors and the like is omitted for ease of explanation.

As shown in FIG. 2, the power supply voltage generation unit 90 generates the power supply voltage Vcc using the reference voltage Vref generated by the reference voltage generation unit 80. The reference voltage generation unit 80 generates the reference voltage Vref that is a constant voltage from the battery voltage V by using a pre-regulator or by resistance division. The power supply voltage generation unit 90 includes an operational amplifier 91. An inverting input terminal of the operational amplifier 91 is connected to an output terminal of the reference voltage generation unit 80. The output terminal of the operational amplifier 91 is connected to the non-inverting input terminal of the operational amplifier 91 so that the output from the output terminal of the operational amplifier 91 serves as the input of the non-inverting input terminal of the operational amplifier 91. By providing the operational amplifier 91 in this manner, negative feedback of the operational amplifier 91 is performed. The operational amplifier 91 outputs from the output terminal a voltage based on a deviation between the reference voltage Vref and the voltage input from the non-inverting input terminal of the operational amplifier 91. When the voltage output from the output terminal of the operational amplifier 91 is stabilized, the power supply voltage Vcc that is a constant voltage is acquired. Accordingly, the power supply voltage generation unit 90 generates the power supply voltage Vcc using the reference voltage Vref.

The operation and effect of the first embodiment will be described.

(1) The standard voltage applied to the voltage application unit 60 can be switched by the switching unit 70 in accordance with the type of the torque sensor 50. That is, the switching unit 70 selectively outputs the reference voltage Vref or the power supply voltage Vcc to switch the voltage applied to the inverting input terminal of the operational amplifier 61 of the voltage application unit 60, and thus the gate voltage Vg applied to the transistor 62 of the voltage application unit 60 is switched. Thereby, the transistor 62 can lower the battery voltage V of the battery 30 to an appropriate operation voltage Vt in accordance with the type of the torque sensor 50 based on the gate voltage Vg corresponding to the type of the torque sensor 50. Therefore, the voltage application unit 60 can apply to the torque sensor 50 an appropriate operation voltage Vt in accordance with the type of the torque sensor 50. Since the operation voltage Vt can be applied in accordance with the type of the torque sensor 50, the number of types of the power supply circuit 20 to be prepared can be reduced, and complexity in management of the power supply circuit 20 can be suppressed.

(2) Since the power supply circuit 20 of the present embodiment can be used for a plurality of types of torque sensors 50, versatility of the power supply circuit 20 can be enhanced. As a result, it is possible to reduce the number of types of the power supply circuit 20 that had to be prepared individually in accordance with the types of torque sensors 50.

(3) As a comparative example, in order to increase the versatility of the power supply circuit 20, it is conceivable to make the circuit configuration of the power supply circuit 20 redundant. In this case, a first voltage application unit and a second voltage application unit are redundantly arranged in the power supply circuit 20. In the first voltage application unit, the reference voltage Vref generated by the reference voltage generation unit 80 is directly input to the inverting input terminal of the operational amplifier 61. In the second voltage application unit, the power supply voltage Vcc generated by the power supply voltage generation unit 90 is directly input to the inverting input terminal of the operational amplifier 61. The power supply circuit 20 is further provided with a selective configuration for selecting which of the first voltage application unit and the second voltage application unit is used. As a result, the power supply circuit 20 is increased in size. In other words, providing redundancy to the power supply circuit 20 and suppressing increase in size of the power supply circuit 20 are in a trade-off relationship. It was thus necessary to maintain balance between enabling the power supply circuit 20 to be used for a plurality of types of the torque sensors 50 and reducing the size of the power supply circuit 20. In this regard, in the present embodiment, the operation voltage Vt of the torque sensor 50 is made variable by allowing the switching unit 70 to switch the standard voltage of the voltage application unit 60. The voltage application unit 60 has conventionally been included in the power supply circuit 20, and only the switching unit 70 is added to the power supply circuit 20 as a new configuration. Therefore, it is possible to reduce the size of the power supply circuit 20 as compared with the case in the comparative example while enabling the power supply circuit 20 to be used for a plurality of types of the torque sensors 50.

(4) The torque sensors 50 may require different operation voltages Vt for their operation. For example, there are torque sensors 50 that output the steering torque Th as an analog value or output the steering torque Th as a digital value, and the operation voltage Vt for each of the torque sensors 50 may be different. In this regard, the switching unit 70 is configured such that an appropriate standard voltage can be selected as the standard voltage of the voltage application unit 60 in accordance with the output mode of the torque sensor 50. Thus, the voltage application unit 60 can apply to the torque sensor 50 the operation voltage Vt corresponding to the reference voltage Vref or the power supply voltage Vcc, that is, the operation voltage Vt corresponding to the output mode of the torque sensor 50. For example, the switching unit 70 can select the power supply voltage Vcc as the standard voltage of the voltage application unit 60 when applying the operation voltage Vt to the torque sensor 50 that outputs an analog value. Alternatively, for example, the switching unit 70 can select the reference voltage Vref as the standard voltage of the voltage application unit 60 when applying the operation voltage Vt to the torque sensor 50 that outputs a digital value.

(5) At the timing when the ignition switch 31 is turned on, the motor control device 1 outputs to the switching unit 70 the identification information I in accordance with the type of the torque sensor 50 connected to the power supply circuit 20. As a result, the switching unit 70 can switch the standard voltage of the voltage application unit 60 to a standard voltage corresponding to the type of the torque sensor 50 based on the identification information I, so that the operation voltage Vt of the torque sensor 50 can be made variable in accordance with the type of the torque sensor 50. Since the operation voltage Vt can be applied in accordance with the type of the torque sensor 50, the number of types of the power supply circuit 20 to be prepared can be reduced, and complexity in management of the power supply circuit 20 can be suppressed. Further, since the type of the torque sensor 50 can be determined using the identification information I acquired by connecting the torque sensor 50 to the power supply circuit 20, an appropriate operation voltage Vt can be applied to the torque sensor 50.

(6) When the operation voltage Vt is applied to the torque sensor 50 that outputs an analog value, the following effects can be obtained after the power supply voltage Vcc is selected as the standard voltage output from the switching unit 70 to the voltage application unit 60. When the switching unit 70 outputs a voltage other than the power supply voltage Vcc to the voltage application unit 60, the power supply voltage Vcc and the standard voltage of the voltage application unit 60 may not be changed in the same manner and may vary individually. In the case of the torque sensor 50 that outputs the steering torque Th as an analog value, the microcomputer 10 reads the analog value (voltage) from the torque sensor 50 with reference to the power supply voltage Vcc that is its own operation voltage. When the power supply voltage Vcc and the operation voltage Vt of the torque sensor 50 vary individually, a reading standard of the analog value output from the torque sensor 50 of the microcomputer 10 varies. Thus, a reading error of the analog value output from the torque sensor 50 becomes large. In this respect, in the present embodiment, the standard voltage of the voltage application unit 60 is set to the same potential as that of the power supply voltage Vcc that is the operation voltage of the microcomputer 10. Thus, a relative error between the voltage detected by the torque sensor 50 and the power supply voltage Vcc that is the standard for reading the analog value output from the torque sensor 50 can be reduced. As described above, in the case of the torque sensor 50 that outputs an analog value, the microcomputer 10 selects the power supply voltage Vcc as the standard voltage of the voltage application unit 60. Therefore, the microcomputer 10 can read the voltage output from the torque sensor 50 more appropriately than in the case where the microcomputer 10 selects a voltage other than the power supply voltage Vcc as the standard voltage.

A motor control device according to a second embodiment will be described. Here, the difference from the first embodiment will be mainly described.

Figure 3:
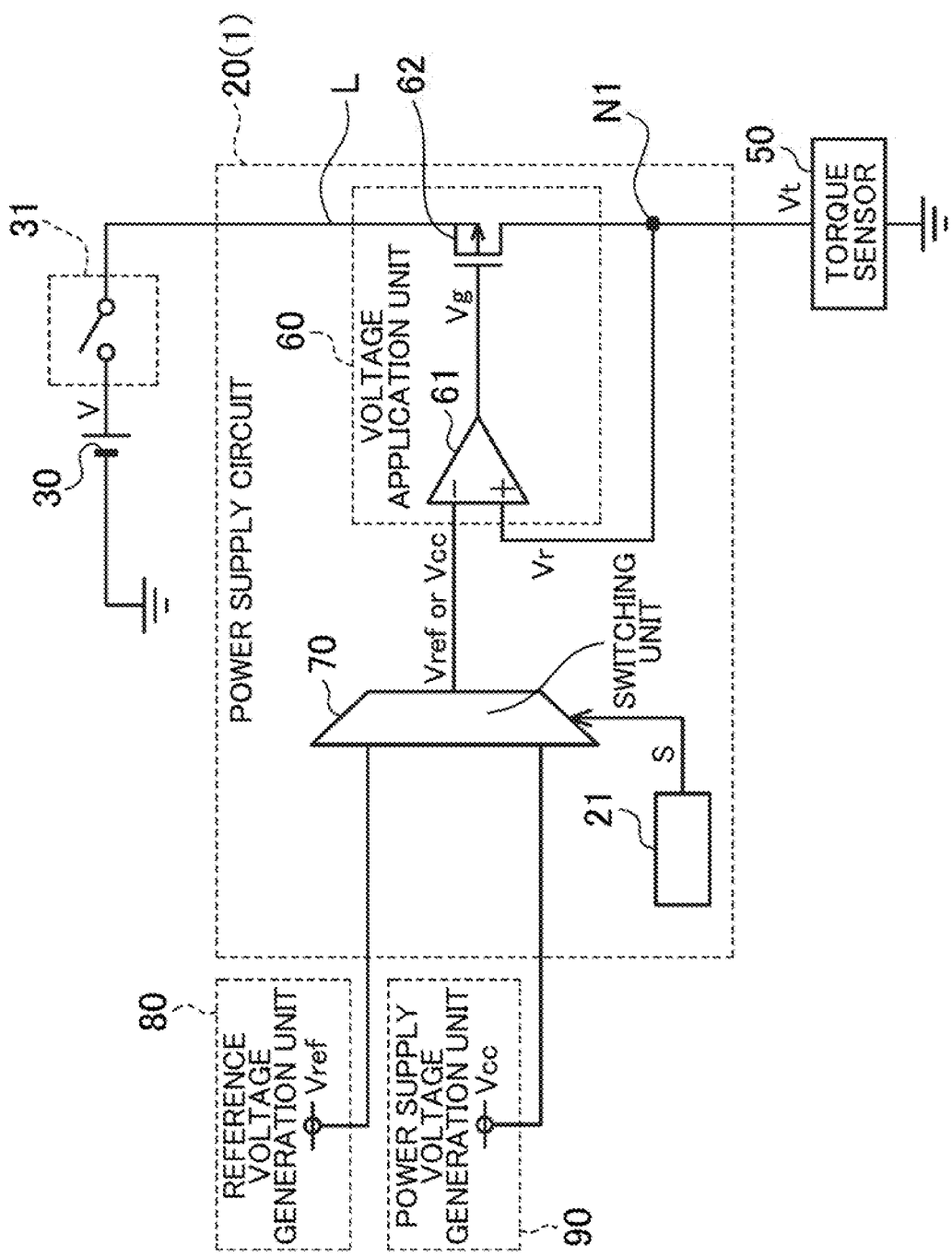
FIG. 3 is a block diagram showing a schematic configuration of a power supply circuit according to a second embodiment.

FIG. 3 shows the power supply circuit 20 of the motor control device 1. The power supply circuit 20 has a terminal unit 21. The terminal unit 21 is switched to a predetermined identification state S based on an operation of a switch provided in the power supply circuit 20 performed by the operator. The operator switches the identification state S of the switch in accordance with the type of the torque sensor 50. When the operation voltage Vt corresponding to the torque sensor 50 that outputs an analog value is generated, the terminal unit 21 is switched to, for example, an analog switching position as the identification state S. When the operation voltage Vt corresponding to the torque sensor 50 that outputs a digital value is generated, the terminal unit 21 is switched to, for example, a digital switching position as the identification state S.

Based on the identification state S, the switching unit 70 outputs either the reference voltage Vref or the power supply voltage Vcc as the standard voltage. Specifically, the switching unit 70 outputs the power supply voltage Vcc when the identification state S is the analog switching position, and outputs the reference voltage Vref when the identification state S is the digital switching position. Thus, the switching unit 70 outputs either the reference voltage Vref or the power supply voltage Vcc selected in accordance with the type of the torque sensor 50.

The operation and effect of the second embodiment will be described.

(7) The switching unit 70 can switch the standard voltage of the voltage application unit 60 based on the identification state S corresponding to the type of the torque sensor 50. The power supply circuit 20 is provided with the terminal unit 21 for outputting the identification state S. Thus, the configuration of the microcomputer 10 can be simplified because it is not necessary to provide the microcomputer 10 with a configuration for outputting the identification state S.

Each of the above embodiments may be modified as follows. The following other embodiments can be combined with each other within a technically consistent range. In the embodiments, the power supply voltage generation unit 90 generates the power supply voltage Vcc using the reference voltage Vref generated by the reference voltage generation unit 80, but the present invention is not limited thereto. For example, the power supply voltage generation unit 90 may generate the power supply voltage Vcc that is a constant voltage from the battery voltage V by using a pre-regulator or by resistance division. In this case, the reference voltage generation unit 80 may generate the reference voltage Vref using the power supply voltage Vcc generated by the power supply voltage generation unit 90.

The voltage application unit 60 is composed by the operational amplifier 61 and the transistor 62, but the present invention is not limited thereto. For example, the voltage application unit 60 may be composed by resistance division or the like. In the embodiments, the identification information I and the identification state S are information indicating "0" or "1", but the present invention is not limited thereto. For example, the identification information I and the identification state S may be character strings indicating standards of the torque sensor 50. In this case, the switching unit 70 switches the standard voltage by reading the character strings of the identification information I and the identification state S.

In the first embodiment, the microcomputer 10 outputs the identification information I to the switching unit 70 at the timing when the ignition switch 31 is turned on. However, the present invention is not limited thereto. For example, the microcomputer 10 may intermittently output the identification information I to the switching unit 70 while the ignition switch 31 is turned on.

The power supply circuit 20 may include the reference voltage generation unit 80 and the power supply voltage generation unit 90. In the embodiments, the switching unit 70 selects one of the two voltages, that is, the reference voltage Vref and the power supply voltage Vcc, based on the identification information I and the identification state S, and outputs the selected voltage as the standard voltage. However, the present invention is not limited thereto. For example, the switching unit 70 may acquire three or more voltages, select any one of the three or more acquired voltages based on the identification information I and the identification state S, and output the selected voltage as the standard voltage.

In the embodiments, the switching unit 70 switches the standard voltage of the voltage application unit 60 based on the identification information I and the identification state S corresponding to the type of the output mode of the output signal of the torque sensor 50. However, the present invention is not limited thereto.

Even though the output mode of the output signal based on the detected steering torque Th is the same, the operation voltage Vt required for operation of the torque sensor 50 may differ. For example, a torque sensor 50 with different specifications and a torque sensor 50 with different measurement targets for measuring the steering torque Th may require different operation voltages Vt for operation of the torque sensor 50 even though the output mode is the same. Even in such a case, a plurality of standard voltages corresponding to the different specifications and the different measurement targets of the torque sensor 50 may be input to the switching unit 70, and the switching unit 70 may switch the standard voltage of the voltage application unit 60 based on the identification information I and the identification state S.

There are torque sensors 50 having different methods of detecting the steering torque Th, such as a magnetostrictive sensor and a piezoelectric sensor. The operation voltages Vt required for operation of such torque sensors 50 may differ. Even in such a case, a plurality of standard voltages corresponding to methods of detecting the steering torque Th may be input to the switching unit 70, and the switching unit 70 may switch the standard voltage of the voltage application unit 60 based on the identification information I and the identification state S.

In the embodiments, the operation voltage Vt is applied to the torque sensor 50 by the voltage application unit 60 of the power supply circuit 20, but the present invention is not limited thereto. For example, the power supply circuit 20 may apply the operation voltage Vt to a rotation angle sensor or to a vehicle speed sensor. In this case, the motor control device 1 may control the motor based on the rotation angle sensor.

In the embodiments, a vehicle on which the motor control device 1 of the embodiment is mounted may be a so-called internal combustion engine vehicle that employs an engine as a vehicle drive source, or a so-called electric vehicle that employs a motor as the vehicle drive source. In the case of an electric vehicle, the start switch is a switch that starts the motor serving as the vehicle drive source.

What is claimed is:

1. A power supply circuit comprising:
   a voltage application unit configured to apply an operation voltage based on a standard voltage to a sensor, of a plurality of sensors, that outputs an output value based on a detected state quantity;
   a switching unit configured to switch the standard voltage of the voltage application unit so that the standard voltage becomes a voltage required to operate the sensor in accordance with a type of the sensor; and
   a first standard voltage generation circuit configured to generate a first standard voltage, wherein:
   one of the sensors is a first sensor configured to output a voltage based on the detected state quantity to a control device connected to the power supply circuit; and
   the switching unit is configured to select, as the standard voltage of the voltage application unit, the first standard voltage that is generated by the first standard voltage generation circuit and having the same potential as a power supply voltage of the control device that is generated from a battery voltage, when the voltage application unit applies an operation voltage to the first sensor.

2. The power supply circuit according to claim 1, the power supply circuit connected to the control device and further comprising:
   a second standard voltage generation circuit configured to generate a second standard voltage, wherein:
   one of the sensors is a second sensor configured to output the detected state quantity as a digital value; and
   the switching unit is configured to select, as the standard voltage of the voltage application unit, the second standard voltage generated from the battery voltage generated by the second standard voltage generation circuit, when the voltage application unit applies an operation voltage to the second sensor.

3. A motor control device including the power supply circuit according to claim 1 and a control device connected to the power supply circuit, wherein:
   when a start switch of a vehicle is turned on, power is supplied from a battery to the control device;
   the control device is configured to store identification information corresponding to the type of the sensor and control driving of a motor;
   the control device is configured to output the identification information corresponding to the type of the sensor connected to the power supply circuit to the switching unit when the start switch is turned on; and
   the switching unit is configured to switch the standard voltage of the voltage application unit based on the identification information.

4. A motor control device including the power supply circuit according to claim 1 and a control device connected to the power supply circuit, wherein:
   when a start switch of a vehicle is turned on, power is supplied from a battery to the control device;
   the control device is configured to store identification information corresponding to the type of the sensor and control driving of a motor;
   the power supply circuit includes a terminal unit configured to output to the switching unit an identification state for identifying the type of the sensor; and
   the switching unit is configured to switch the standard voltage of the voltage application unit based on the identification state.

* * * * *